(12) United States Patent
Bindocci et al.

(10) Patent No.: US 7,180,285 B2
(45) Date of Patent: Feb. 20, 2007

(54) ELECTRODYNAMIC POSITION TRANSDUCER WITH ELECTRONIC MEMORY MEANS

(75) Inventors: Sabrina Bindocci, Collegno (IT); Paolo Da Pont, Turin (IT); Paolo Senor, Condove (IT); Giorgio Carrer, Turin (IT); Sergio Giordano, Caselle Torinese (IT); Angelo Muneretto, Rivoli (IT)

(73) Assignee: Elbi International S.p.A., Turin (IT)

( * ) Notice: Subject to any disclaimer, the term of this patent is extended or adjusted under 35 U.S.C. 154(b) by 0 days.

(21) Appl. No.: 10/508,212

(22) PCT Filed: Mar. 18, 2003

(86) PCT No.: PCT/IB03/01070

§ 371 (c)(1),
(2), (4) Date: Sep. 20, 2004

(87) PCT Pub. No.: WO03/078951

PCT Pub. Date: Sep. 25, 2003

(65) Prior Publication Data

US 2005/0140359 A1    Jun. 30, 2005

(30) Foreign Application Priority Data

Mar. 19, 2002 (IT) .......................... TO2002A0245

(51) Int. Cl.
*G01B 7/14* (2006.01)
(52) U.S. Cl. .................................... 324/207.15; 73/728
(58) Field of Classification Search .......... 324/207.12, 324/207.13, 207.14, 207.15, 207.16, 207.17, 324/207.24, 207.26; 73/728, 722
See application file for complete search history.

(56) References Cited

U.S. PATENT DOCUMENTS

| | | | | |
|---|---|---|---|---|
| 3,455,532 A | * | 7/1969 | Barker | 251/29 |
| 3,884,079 A | * | 5/1975 | Turtle et al. | 73/701 |
| 4,149,133 A | * | 4/1979 | Hilgert | 336/30 |
| 4,174,638 A | * | 11/1979 | Zabler et al. | 73/728 |

FOREIGN PATENT DOCUMENTS

| | | |
|---|---|---|
| DE | 198 35 865 A | 2/1999 |
| EP | 0 254 707 A | 1/1988 |

* cited by examiner

*Primary Examiner*—Jay M. Patidar
(74) *Attorney, Agent, or Firm*—Sughrue Mion, PLLC

(57) ABSTRACT

The transducer (1) comprises: a rigid casing (2–4) in which a membrane (5) is clamped which, together with a portion of the casing (2–4), defines at least one chamber (6, 7) of variable volume; at least one winding (14); an interaction element (13), able to interact magnetically with the winding (14) under the effect of a displacement of the membrane (5), in such a way that the inductance of the winding (14) is variable in dependence on the relative position of the interaction element with respect to the winding (14), and circuit devices (17) connected to the winding (14) and operable to supply electrical signals of which one parameter, frequency for example, is variable in dependence on the inductance of the winding (14); the said circuit devices (17) including a memory (22) operable to store data representative of corrective values which, when applied in operation to the effective instantaneous values of the said parameter, make it possible to obtain correct values of the parameter corresponding to a predetermined transduction characteristic.

3 Claims, 2 Drawing Sheets

US 7,180,285 B2

ELECTRODYNAMIC POSITION TRANSDUCER WITH ELECTRONIC MEMORY MEANS

This is a National Stage entry of Application No. PCT/IB03/01070 filed Mar. 18, 2003; the disclosure of which is incorporated herein by reference.

BACKGROUND OF THE INVENTION

The present invention relates to an electrodynamic position transducer usable, for example, as a pressure transducer in a washing machine or a dishwasher, in a gas boiler or in a variety of domestic electrical appliances.

The invention relates more specifically to a transducer including:

- a hollow rigid casing within which is clamped a membrane which, together with a portion of the casing, defines at least one chamber of variable volume;
- at least one winding;
- an interaction element operable to interact magnetically with the winding as a result of a displacement of the membrane, in such a way that the inductance of the said winding is variable in dependence on the relative position of the said element with respect to the winding, and
- circuit means connected to the said winding and operable in use to supply electrical signals of which one parameter, the frequency for example, is variable as a function of the inductance of the said winding.

The behaviour of a transducer of this type can be defined by means of a transduction characteristic, such as a frequency/position characteristic, for example.

One problem which is encountered with such transducers consists in the initial calibration of their transduction characteristics. To this end, numerous essentially mechanical arrangements are known in the art, by which calibration is carried out by adjusting the position of one or more mechanical members capable of modifying the position of the interaction element relative to the winding and/or the characteristics of one or more suspension and/or biasing springs associated with the membrane and/or the interaction element.

In order to be able to achieve this calibration mechanically, the structure of prior art transducers is necessarily complex. In addition, the calibration operation is laborious and subject to possible changes over time.

SUMMARY OF THE INVENTION

One object of the present invention is to provide a transducer of the type defined above, the calibration of which can conveniently be carried out electronically, without the need to adjust the position of the adjustment members mechanically, thereby making it possible drastically to simplify the mechanical structure of the transducer itself.

These and other objects are achieved according to the invention by providing a transducer of the aforesaid type, in which the said circuit means include electronic memory means operable to retain data representative of corrective values which, applied in operation to the effective instantaneous values of the aforesaid parameter make it possible to retain correct values of the said parameter correspond to a predetermined transduction characteristic.

BRIEF DESCRIPTION OF THE DRAWINGS

Further characteristics and advantages of the invention will become apparent from the detailed description which follows, provided purely by way of non-limitative example, with reference to the appended drawings, in which.

DETAILED DESCRIPTION OF THE INVENTION

Figure 1:
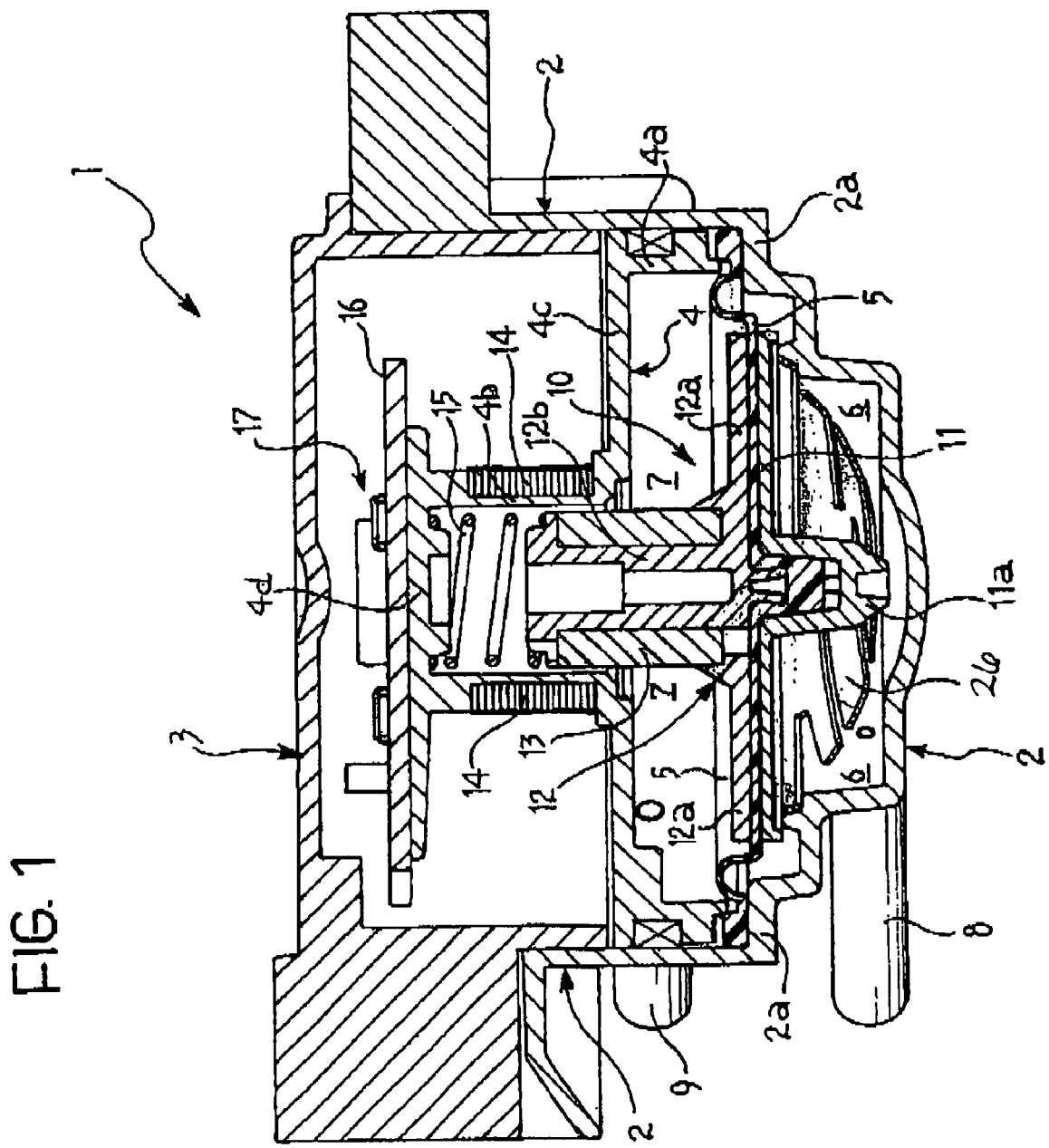
FIG. 1 is a sectioned view of a transducer of the invention which can be used as a pressure transducer.

In FIG. 1, a transducer according to the invention is generally indicated 1.

In the embodiment illustrated by way of example, the transducer 1 is operable to act as a pressure transducer, of differential type. Moreover, as will become more apparent hereinbelow, the invention is not limited to this type of transducer.

In the embodiment given by way of example, the transducer 1 comprises a rigid casing formed by a first element 2, substantially in the shape of a cup, and by a second element 3, also substantially cup shape and partially interpenetrated with the cup element 2.

Within the casing of the transducer 1, a support body, generally indicated 4, is interposed between the elements 2 and 3. This body has a lower annular portion 4a and an upper tubular portion 4b, joined together by a transverse annular wall 4c.

The tubular portion 4b of the support body 4 is closed at one end by an end wall 4d.

A resilient membrane, constituted for example by an elastomeric material, is indicated 5. The periphery of this membrane is clamped in a fluid tight manner between the lower annular portion 4a of the support body 4 and a shoulder 2a forming part of the cup-like body 2.

This membrane divides the region between the lower portion of the cup body 2 and the support body 4 into two chambers of variable-volume, indicated 6 and 7.

The cup-shape element 2 of the transducer casing has a tubular connector 8 which enables a first fluid to be introduced into the chamber 6 and a second tubular connector 9 for the introduction of a fluid into the chamber 7. In operation, the instantaneous position of the membrane 5 depends (for example) on the difference between the pressure in the chambers 6 and 7.

The central portion of the membrane 5 is connected to a movable device generally indicated 10. This device includes a plate 11 with a central protuberance 11a snap engaged (with the interposition of the membrane 5) with the head portion 12a of an essentially mushroom-shaped body 12.

The plate 11 extends into the chamber 6, while the mushroom-shape body 12 extends into the chamber 7. This body 12 has a tubular stem or shank 12b around which is disposed an annular, cylindrical element 13 made of a ferromagnetic material.

The stem or shank 12b of the body 12 and the associated interaction element 13 of ferromagnetic material partly extend axially into the tubular upper portion 4b of the support body 4. A winding 14 of insulated electrical wire is disposed around this portion 4b of the body 4.

In the embodiment illustrated by way of example, a coil spring 15 is interposed between the end wall 4d of the support body 4 and the free end of the stem or shank 12b of the body 12. A further, essentially conical spring 26 is located in the chamber 6 between the plate 11 and the lower wall of the cup-shape body 2.

Figure 2:
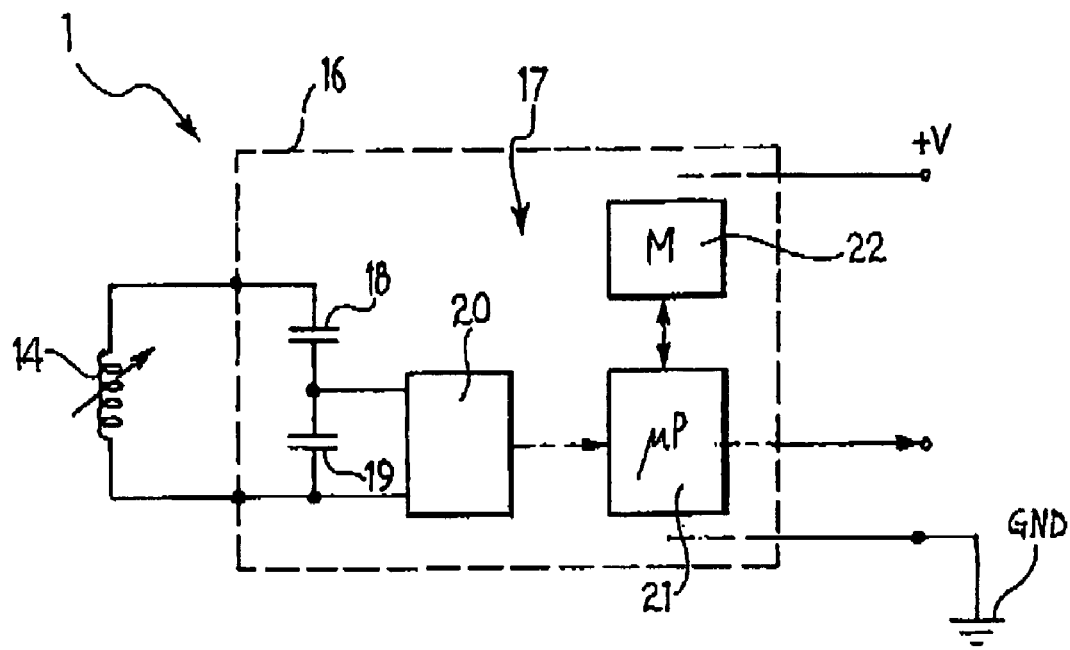
FIGS. 2 and 3 are circuit diagrams, partly in the form of block diagrams, showing the circuit component of two embodiments of the transducer of the invention.
Figure 3:
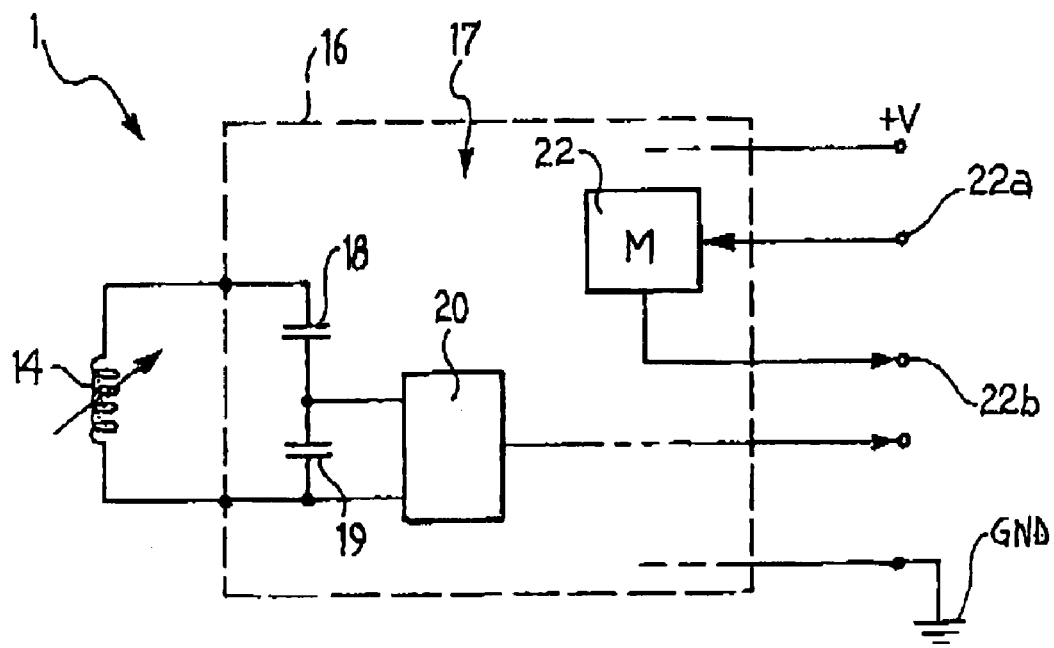

A circuit board 16, bearing components and circuits generally indicated 17 in FIGS. 1 to 3, is fixed to the end wall 4d of the support body 4, on the opposite side from the membrane.

The winding 14 is connected to these circuits.

In operation as a differential pressure transducer, the instantaneous position of the membrane 5 depends on the difference between the fluid pressures in chambers 6 and 7. As this difference varies, the mobile device 10 moves axially relative to the winding 14. As the coupling between the ferromagnetic element 13 and the winding 14 varies, the inductance of the latter also varies.

As illustrated schematically in FIGS. 2 and 3, the circuits 17 carried by the plate 16 include, for example, capacitors 18 and 19 coupled to the winding 14 and forming an LC circuit therewith. This LC circuit is connected to a circuit 20 of a type which is known per se and which, in operation, generates an electrical signal one parameter of which, such as the frequency, is variable in dependence on the inductance of the winding 14.

Once it is assembled at the point of manufacture, the transducer 1 has a transduction characteristic (for example a frequency/pressure or a frequency/pressure difference characteristic,) which, in general, differs from one device to another, as a result of mechanical and electrical tolerances. Each transducer must therefore be calibrated so that they all have the same desired transduction characteristic.

In the arrangement illustrated schematically in FIG. 2, the circuits associated with the transducer 1 include a microprocessor 21 with associated non-volatile memory devices 22.

During the step of calibrating the transduction characteristic of one particular transducer, the associated microprocessor 21 calculates the corrective values of the variable parameter of the signal provided by the circuit 20 and stores it in the memory devices 22. With reference to the use of the transducer 1 as a pressure transducer, this can be achieved, for example, by applying predetermined pressure values or pressure difference values to the transducer and comparing the corresponding instantaneous effective values of the variable parameter of the signal supplied by the circuit 20 with corresponding pre-established values, corresponding to the desired transduction characteristic.

During normal operation of the transducer, the microprocessor 21 receives an electrical signal from the circuit 20 with a variable parameter which is not correct and applies to this parameter the corrective values stored in the memory devices 22 during the calibration process. The microprocessor 21 thus provides output signals or data which represent the correct values of the parameter, corresponding to the predetermined transduction characteristic.

In the embodiment illustrated in FIG. 3, the circuits 17 associated with the transducer do not include a microprocessor, but only non-volatile memory devices 22 with externally accessible input 22a and output 22b.

During the calibration step, a transducer 1 of the type shown in FIG. 3 is connected to a calibration machine including a microprocessor controlled electronic unit, connected to the output of the circuit 20 of the transducer and to the input 22a and the output 22b of the memory 22.

The electronic unit of the calibration machine is arranged to calculate the corrective values of the variable parameter of the signal supplied by the circuit 20 of the transducer and to store this in the memory devices 22 thereof.

The transducer can then be incorporated into an appliance (such as a washing machine) and connected to the electronic control unit of the appliance. It is convenient if this unit is operable, during operation, to access the corrective values stored in the memory devices 22 and to apply them to the actual instantaneous effective values of the variable parameter of the signal generated by the transducer 1 during operation.

A transducer according to the invention can be used to convert into electrical signals other physical quantities than those relating to pressure, provided these are able to cause a relative movement of the interaction element with respect to the winding.

Naturally, the principle of the invention remaining unchanged, embodiments and manufacturing details can vary widely from those described and illustrated purely by way of non-limitative example, without by this departing from the scope of the invention, as defined in the appended claims.

What is claimed is:

1. An electrodynamic position transducer comprising:
   a hollow rigid casing with a membrane mounted therein, which defines at least one chamber of variable volume;
   at least one winding;
   an interaction element that interacts magnetically with the winding by the effect of a displacement of the membrane so that the inductance of the winding is variable as a function of the relative position of the interaction element with respect to the winding; and
   circuit means connected to said winding that provides electrical signals of which one parameter is variable depending on the inductance of said winding;
   wherein said circuit means comprises electronic memory means that store data representative of corrective values which, when applied to effective instantaneous values of said parameter, to obtain the correct values of said parameter corresponding to a predetermined transduction characteristic;
   wherein said memory means comprises an input and an output accessible from outside said transducer and connectable to an electronic control unit of an appliance in which the transducer is incorporated, thereby enabling said unit to access the corrective values stored in the said memory means to apply them to the effective instantaneous values of said parameter generated during operation of the transducer.

2. A transducer according to claim 1, in which said at least one chamber has an aperture for introducing a fluid, the pressure of which acts on the membrane.

3. A transducer according to any preceding claim, in which the interaction element comprises a ferromagnetic core.

* * * * *